Dec. 1, 1931.    R. M. McCALLEY    1,834,102
LEAKPROOF COVER FOR BELL AND SPIGOT PIPE JOINTS
Filed June 29, 1926
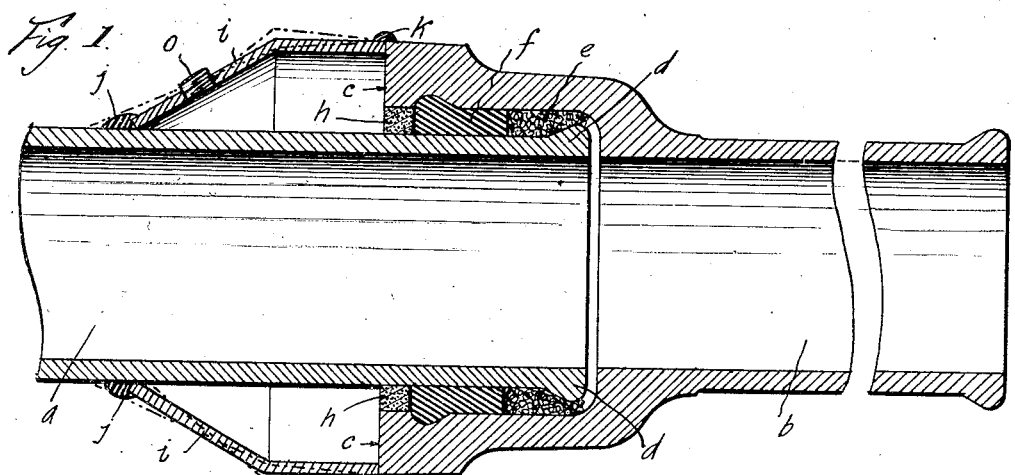
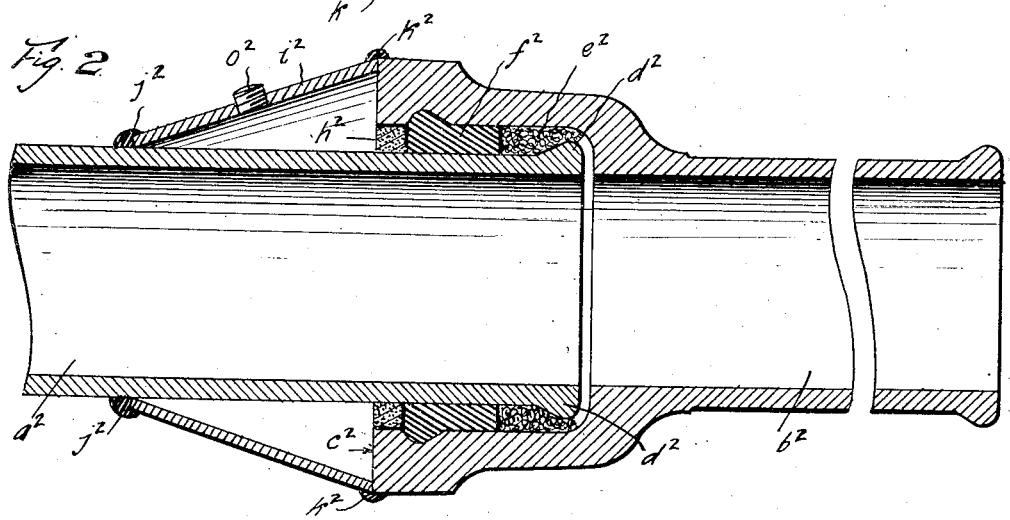
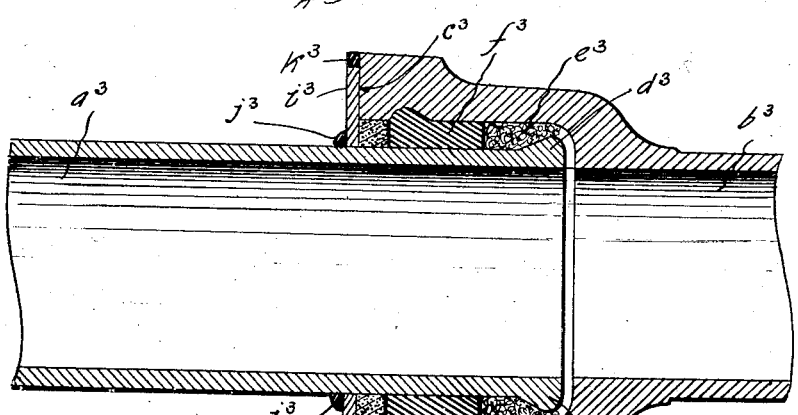
Inventor
Roderick M. McCalley
F. J. Geisler
Attorney Patented Dec. 1, 1931

1,834,102

UNITED STATES PATENT OFFICE

RODERICK M. McCALLEY, OF PORTLAND, OREGON

LEAKPROOF COVER FOR BELL AND SPIGOT PIPE-JOINTS

Application filed June 29, 1926. Serial No. 119,341.

My invention relates to cast iron or steel pipes installed or to be installed for distributing gas or water or for sewage disposal, in which class the sections are generally connected by a bell-and-spigot joint.

To better describe the purpose and utility of my invention, it is convenient to refer briefly to the present methods for rendering these pipe-joints leak proof. The joint referred to consists in an enlarged "bell" shaped socket on one end of the pipe into which the "spigot" end of the next adjoining length or section of pipe is inserted. An annular space is provided within the "bell" or socket to receive packing material with which to fill up the space to make the joint tight.

The mode of packing the joint usually used is to insert and pack, or calk, into place several layers of yarn or oakum. Pig lead is then heated and poured into the joint, the yarn or oakum forming a backing for the lead.

These joints, inevitably leak due to subsequent movement of the pipe, caused by settling of the pipe, traffic vibrations, or underground construction work. The movement of the pipe is also caused by a "creeping" action, due to the effects of contraction and expansion. All of these factors affect the tightness of the joint; for since lead has little resiliency any subsequent movement of the pipe tends to cause a permanent set in the lead, and small fissures result which allow leakage.

Several means have been devised to cover the pipe joints so as to prevent leakage, such means employing clamps in some form or other, and depending for their effectiveness upon the compression either of two metal surfaces together, or upon a gasket placed between the compressed metal surfaces.

But experience has demonstrated that a pipe-joint of the character described which depends for its tightness upon the compression of two metal surfaces together or upon a gasket between them is not reliable. Clamps are unsatisfactory because they provide no stability in the ensealing means of which they constitute a part, for they will inevitably be subjected to a movement of the connected pipe section but are not capable of accommodating such movement.

Therefore, it has been attempted to enclose the pipe joint with an ensealing jacket made of lead, as illustrated, for example, by the United States patent granted to Corbin March 25, 1902, No. 696,316. But the ends of this ensealing jacket were also secured by clamps to the connected pipe section, and hence the unsatisfactory character of the latter is present just the same. Lead being a soft metal, having but little resiliency, would be subject to the same action as the original lead packing of the pipe-joint and therefore, the inefficiency of such packing has not been overcome.

My observations have convinced me that some harder metal and greater tensile strength than lead must be used as an ensealing jacket or cover for the joint and that clamps as the connecting means will not do. Since cast iron and steel are to be used for making the pipe sections, the ends of the cover of its joints must be united with the pipe sections, and the connection so produced must be of such nature that the united pipe sections and the cover constitute a homogeneous, continuous, integral structure; homogeneous in the sense that the parts so united including the band between them must be sufficiently similar in character as in effect to constitute a substantial unit adapted in all its components to yield to the relative movements of the pipe sections after having been installed.

The soldering of the ends of the ensealing jacket to the connected pipe sections would not be practicable because the solder would not hold under any relative movements of the connected pipe sections.

I attain my object of rendering said pipe joint leak proof—by enclosing the joint in a cover forming a continuous integral structure with the connected pipe section; said cover consisting of an annular collar of ductile metal suitable for welding; the collar being mounted on the spigot-end of one pipe section and covering the mouth of the bell-end of the other pipe section, the exterior periphery of said collar coinciding with that of the rim of said mouth; and the interior periphery of said collar being welded to the circumference of said spigot-end, and the exterior periphery of said collar being welded to the rim of the mouth of said bell; the form of the collar and the ductile character of the metal of which it is made adapting it to accommodate the relative movements of the connected pipe-section with each other, thereby preventing the rupture of the integral character of the pipe structure by said movements.

In order to make full provision for the relative movements of the connected pipe-section, when such movements may be looked for in greater degree by reason of climatic or other conditions, I make the collar conical, and of more or less angular form in longitudinal section.

Furthermore, when my method is to be used for the joints of an installed pipe, I make my collar of two longitudinally divided half-sections, the longitudinal seams of which half sections are welded together after they have been put in place, to make the collar itself an integral unit.

Furthermore, my method of rendering the joints of a bell-and-spigot-pipe leak proof, incidentally increases the strength of the resulting joint, and in so doing permits the use of greater pressure than the ordinary joints of such pipes would stand.

The growth of most gas or water distribution systems require a constant increase in the internal pressure, and therefore, some efficient method of preventing leakage at the joints is necessary. My method permits the increase of the internal pressure up to the strength of the pipe itself, and at the same time insures tightness of the joint even with such increased pressure. Such results could not be obtained by any mere calking method; nor by any method such as described for example in said Corbin patent.

The further details of my invention and the manner of practicing the same are hereinafter fully described with reference to the accompanying drawings, in which:

Fig. 1 illustrates one embodiment of my invention in a pipe joint for rendering the same leak-proof; the illustration here shown representing my invention as comprising a collar of annular, partly conical form, and more or less of angular form in longitudinal section, so that the collar by flexing under the relative movements of the connected pipe section is adapted to accommodate such movement;

Fig. 2 shows a somewhat similar but simpler method for carrying my invention into practice; and also shows the providing of a removable plug in the ensealing collar, so as to permit the escape of gases where my invention is applied to render gas-main joints leak-proof, thus preventing the accumulation of an explosive mixture under the unsealing collar; and Fig. 3 is a still simpler form of practicing my invention, as will hereinafter be more fully described.

In the drawings, I have designated like parts by like reference characters, but with numerical exponents referring to the respective figures of which they are a part.

"$a$" represents the "spigot-end" of a cast iron pipe which is usually provided with an annular "bead" "$d$".

"$b$" represents the socket or "bell-end" of a cast iron pipe, usually provided with an enlarged cross section at the face "$c$".

The joint packing material may be composed of yarn or oakum "$e$" and the lead or other plaster facing material "$f$". Both the yarn and the lead being compressed into place by "calking" either by hand or with pneumatic tools, as usual.

An annular collar $i$ of ductile metal suitable for welding is then placed on the pipe joint and snugly fitted to the spigot-and-bell ends; the collar being of such diameter that its exterior periphery coincides with that of the rim of said mouth of the bell and covering the latter. The collar is then welded to the spigot-end of the pipe section at $j$ and to the rim of the bell or mouth of the other pipe section as at $k$.

The lead packing in the bell should first be recalked to insure the temporary stopping of leakage, if any.

The small recess left at the face $c$ of the bell as a result of calking the lead in the original installation, as well as from the recalking is preferably filled with a heat resistant non-shrinking retort cement, $h$, thereby to protect the lead packing from the heat developed during the welding of the ends of the collar on the connected pipe sections.

The form of collar illustrated by Figs. 1 and 2 is especially adapted for use on gas mains. A ventilating opening $o$ having a removable plug is provided to prevent the accumulation of an explosive mixture of gases. The plug may be threaded into the vent-opening and the plug is subsequently brazed or welded to insure against leakage.

The forms of collar used in Figs. 1 and 3 are designed to allow movement of the connected pipe sections, for example, to accommodate expansion and contraction of the pipe as a whole, and of course all pipes laid either under or above ground are subject more or less to the effect of expansion and contraction.

Furthermore, some flexibility must be provided in the collar whenever the unit stress induced by temperature changes approaches the unit working strength of the material of the pipe. And as a factor of safety, it is advisable to provide an efficient means to provide in the collar structure for any movement of the connected pipe sections.

To illustrate the collars under contraction, I will take the approximate forms indicated by the dotted lines $i$ in Fig. 1 and by $i3$ in Fig. 3.

Under ordinary circumstances the collar $i$ can be made of low carbon steel. Other cases may arise where more ductile material such as copper or compounds thereof may be deemed preferable. To accommodate the movements of connected pipe-sections, this collar is made of annular conical form and more or less angular in longitudinal section.

Installations in corrosive soils may require the use of anti-corrosive material, such as copper bearing steel, or the use of protective coating mediums such as asphalt dips.

The collars $i$ and $i2$ in Figs. 1 and 2 are of conical or partially conical form so as to extend back away from the face of the bell "$c$" to the point "$j$" on the spigot-end, in order to keep the heat due to welding away from the lead packing in the bell, a sufficient distance to prevent the lead from being melted and running into the interior of the pipe to form an obstruction. This distance will vary with the diameter, and consequently the thickness, of the material in the pipe.

The thickness of the bell at $c$ is sufficient to prevent excessive heat transmission to the lead packing $f$. The location of the welding at point $j$ is preferably removed a distance of from 4 to 6 inches away from the lead packing.

With large pipe having relatively thick cross section, the annular collar $i3$ shown in Fig. 3 may be used, since the effect of the heat developed in welding is not so readily transmitted to the lead packing as with pipes with thinner cross section. The accommodation of this collar to movements of the connected pipe sections is illustrated by dotted lines.

However, I prefer the type of collar illustrated by Fig. 1 since it incorporates adequate factors of safety to take care of all situations, and the difference in cost between the type of collars shown in Figs. 1, 2 and 3 is negligible.

My method can, of course, be used for repairing lines already laid and in sewers, or new installations.

When new pipe is put into place only sufficient packing to hold the pipe in proper alinement is required. This packing can be of any inexpensive material such as rope yarn. The lead packing and the heat resistant paste may be omitted.

The welding can be done either with the acetylene, hydrogen or electric welding process using either bronze or iron welding rods.

The welding process which I prefer is one utilizing a relatively low flame temperature; for example, satisfactory welds can be secured by using bronze rods and hydrogen gas, since the flame temperature can thus be kept down to approximately 1200 degrees Fahrenheit. This relatively low tempreature has little effect upon the cast iron of the pipe, and therefore does not reduce the tensile strength thereof.

My method gives a positive means of eliminating all leakage from the joint, and is unaffected by subsequent movement of the pipe being an integral part thereof. This efficiency of the weld, which is of paramount consideration can be increased, and the time required for welding, consequently the cost of welding decreased, by first grinding the surface of the cast iron pipe at the points $j$ and $k$, this grinding providing a smooth surface to receive the molten welding material insuring an efficient bond.

I claim:

1. In combination with a bell-and-spigot cast-iron pipe joint, a leak proof cover comprising, an elongated collar of flexible metal, one end of the collar being enlarged to conform with the rim of the bell-section of the joint and being welded thereto, the opposite end of the collar conforming with the circumference of the spigot and being welded thereto at a point spaced a substantial distance from the caulking in the mouth of the bell and the collar having an angular longitudinal profile to accommodate relative lengthening and shortening of the distance between the two weldings due to the longitudinal movement of one pipe section with respect to the other.

2. A plurality of pipe sections joined by a bell and spigot joint and a leakproof cover for said joint; said cover comprising an elongated collar of flexible material, one end of the collar conforming with the circumference of the rim of the bell section of the joint, the opposite end conforming with the circumference of the spigot section, said leakproof collar being secured to the pipes by welding and non-shrinking retort cement within the space between the collar and the joint.

3. A pair of pipe sections engaging each other with a bell-and-spigot joint, packing material within said bell having a melting point low with respect to that of the material of the pipe, an elongated collar surrounding said joint to provide a leakprof cover therefor, one end of said collar conforming with the circumference of the bell and being welded thereto, the opposite end of said collar conforming with the circumference of the spigot section and welded thereto a substantial distance from the bell, and non-shrinking refractory cement covering the mouth of the bell whereby the packing material is held in place should it become liquefied during the welding operations.

RODERICK M. McCALLEY.